US012717519B2

(12) United States Patent
Kim

(10) Patent No.: US 12,717,519 B2
(45) Date of Patent: Aug. 25, 2026

(54) DYNAMIC RANDOM ACCESS MEMORY SYSTEM SWITCHING BETWEEN OPERATION REQUEST TYPES BASED ON SCORING AND METHOD FOR OPERATING THE SAME

(71) Applicant: SK hynix Inc., Icheon-si (KR)

(72) Inventor: Dong-Gun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/661,244

(22) Filed: May 10, 2024

(65) Prior Publication Data

US 2025/0165185 A1 May 22, 2025

(30) Foreign Application Priority Data

Nov. 16, 2023 (KR) ........................ 10-2023-0159418

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 3/061; G06F 3/0607; G06F 3/0658; G06F 2212/1016
See application file for complete search history.

(56) References Cited

U.S. PATENT DOCUMENTS

2004/0080993 A1 4/2004 Takahashi et al.
2005/0021921 A1* 1/2005 Blackmon ........... G06F 13/1631 711/158
2019/0196995 A1* 6/2019 Shen ................... G06F 13/1626

FOREIGN PATENT DOCUMENTS

KR 10-2019-0019215 A 2/2019
KR 10-2021-0008604 A 1/2021

OTHER PUBLICATIONS

An article titled "What is DRAM hierarchy?" https://web.archive.org/web/20240420023023/https://chipress.online/2024/04/12/what-is-dram-hierarchy/ (Year: 2024).*

* cited by examiner

*Primary Examiner* — Janice M. Girouard

(57) ABSTRACT

The dynamic random access memory system may store the plurality of first operation requests in storage units corresponding to each of the plurality of banks included in dynamic random access memory media respectively, classify the plurality of first operation requests into a plurality of types based on a reference first operation request, determine a score based on the number of first operation requests corresponding to each of the plurality of types, determine whether a switch condition is satisfied based on the score, and suspend, when the switch condition is satisfied, processing of the plurality of first operation requests and processing of a plurality of second operation requests.

18 Claims, 12 Drawing Sheets

110
BNK
BNK
BNK
120
BNK_SU
RQ1
BNK_SU
RQ1
BNK_SU
RQ1
RQ1
RQ1
RQ2
RQ2
execute RQ1
200

FIG.4
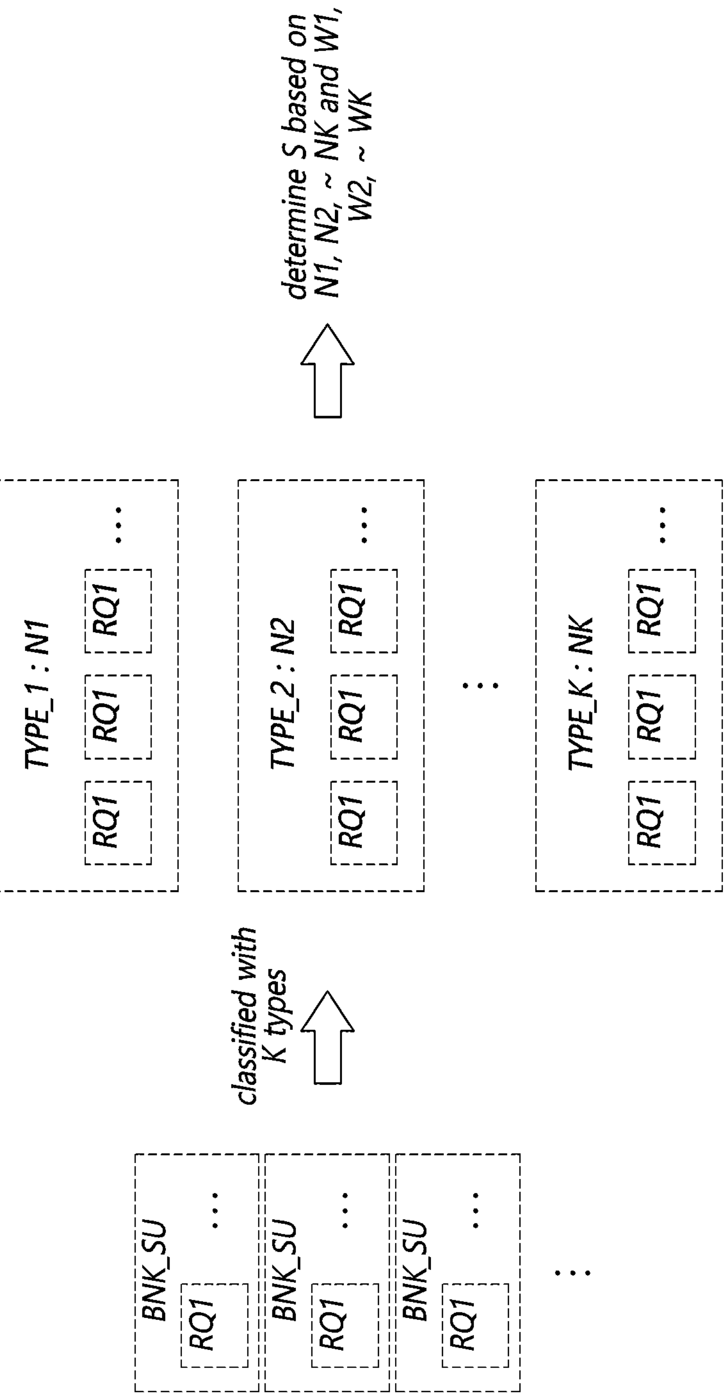
BNK_SU
RQ1
BNK_SU
RQ1
BNK_SU
RQ1
classified with K types
TYPE_1 : N1
RQ1
RQ1
RQ1
TYPE_2 : N2
RQ1
RQ1
RQ1
TYPE_K : NK
RQ1
RQ1
RQ1
determine S based on N1, N2, ~ NK and W1, W2, ~ WK

DYNAMIC RANDOM ACCESS MEMORY SYSTEM SWITCHING BETWEEN OPERATION REQUEST TYPES BASED ON SCORING AND METHOD FOR OPERATING THE SAME

CROSS-REFERENCE TO RELATED APPLICATION

The present application claims priority under 35 U.S.C. § 119(a) to Korean patent application number 10-2023-0159418 filed in the Korean Intellectual Property Office on Nov. 16, 2023, which is incorporated herein by reference in its entirety.

BACKGROUND

1. Technical Field

Various embodiments of the present disclosure generally relate to a dynamic random access memory system that switches executing operation request based on score and a method for operating the memory system.

2. Related Art

Volatile memory (e.g. SRAM, DRAM) loses stored data when power supply is cut off, and non-volatile memory (e.g. NAND flash, PRAM, MRAM) retains stored data even when power supply is cut off.

Dynamic random access memory (DRAM) may continuously execute read operations or write operations, generally without delay. However, a delay may occur when the dynamic random access memory executes a write operation after executing a read operation or executes a read operation after executing a write operation.

To reduce delay, a dynamic random access memory needs to schedule read and write operations by minimizing switches between read and write operations to execute read or write operations so that operations may proceed in as continuous a manner as possible.

SUMMARY

Various embodiments of the present disclosure are directed to a dynamic random access memory system capable of improving read and write performance by efficiently scheduling read and write operations, and a method thereof.

In an embodiment of the present disclosure, a dynamic random access memory system may include: a dynamic random access memory media including a plurality of banks; and a controller configured to, store, when processing a plurality of first operation requests for the dynamic random access memory media, the plurality of first operation requests in storage units corresponding to each of the plurality of banks respectively, classify the plurality of first operation requests into a plurality of types based on a reference first operation request, determine a score based on the number of first operation requests corresponding to each of the plurality of types, determine whether a switch condition is satisfied based on the score, and suspend, when the switch condition is satisfied, processing of the plurality of first operation requests and switching to processing of a plurality of second operation requests.

In another embodiment of the present disclosure, an operating method of a dynamic random access memory system may include: storing, when processing a plurality of first operation requests for dynamic random access memory media including a plurality of banks, the plurality of first operation requests in storage units corresponding to each of the plurality of banks respectively; classifying the plurality of first operation requests stored in the storage units into a plurality of types based on a reference first operation request; determining a score based on the number of first operation requests corresponding to each of the plurality of types; determining whether a switch condition is satisfied based on the score; and when the switch condition is satisfied, suspending processing of the plurality of first operation requests and changing to processing of a plurality of second operation requests for the dynamic random access memory media.

According to the embodiments of the present disclosure, it is possible to improve read and write performance by efficiently scheduling read and write operations

BRIEF DESCRIPTION OF THE DRAWINGS

FIG. 4 is a diagram showing an operation in which a controller determines a score according to an embodiment of the present disclosure.

DETAILED DESCRIPTION

Figure 1:
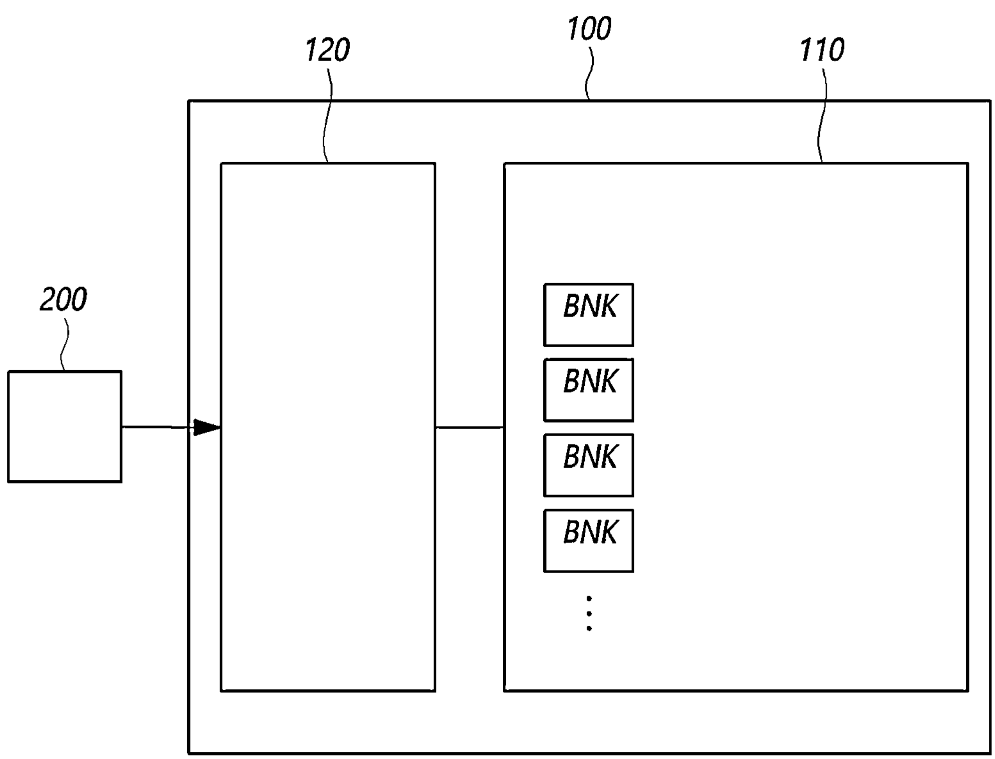
FIG. 1 is a schematic configuration diagram of a dynamic random access memory system according to an embodiment of the present disclosure.

Hereinafter, embodiments of the present disclosure are described in detail with reference to the accompanying drawings. Throughout the specification, references to "an embodiment," "another embodiment" or the like are not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and the disclosure should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a dynamic random access memory system according to an embodiment of the present disclosure.

Referring to FIG. 1, a dynamic random access memory system 100 may include a dynamic random access memory media 110 and a controller 120.

The dynamic random access memory media 110 may include a plurality of banks BNK.

The dynamic random access memory media 110 may store data in the plurality of banks BNK, and read data stored in the plurality of banks BNK. The dynamic random access memory media 110 may perform a periodic refresh operation to retain stored data. If power supply to the dynamic random access memory media 110 is cut off, the data stored in the dynamic random access memory media 110 is lost.

In order to execute a request from an external device 200, the controller 120 may process a plurality of operation requests for the dynamic random access memory media 110. The external device 200 may be a host that uses the dynamic random access memory system 100. And the external device 200 and the controller 120 may communicate through a predetermined interface (e.g., a Compute eXpress Link (CXL)).

The controller 120 may transmit the plurality of operation requests to the dynamic random access memory media 110 in order to process the plurality of operation requests. When the dynamic random access memory media 110 executes the received plurality of operation requests and transmits a response to the controller 120, the processing of the plurality of operation requests may be completed.

For example, the dynamic random access memory media 110 may execute a plurality of read requests and transmit read data to the controller 120.

As another example, the dynamic random access memory media 110 may execute a plurality of write requests and respond to the controller 120 with information as to whether data was normally written.

The controller 120 may be implemented in various ways.

For example, the controller 120 may be implemented as an integrated circuit including logic gates for executing the above-described operations. The controller 120 may be implemented with an Application Specific Integrated Circuit (ASIC), a Field Programmable Gate Array (FPGA), etc.

As another example, the controller 120 may include a processor that executes an operation to control the operation of processing a plurality of operations requests, and a working memory that stores data necessary to process the plurality of operation requests.

The processor may control an operation of the controller 120 by executing firmware. The processor may execute firmware to control overall operations of the controller 120 and to execute logical operations. Firmware is a program that is executed within the controller 120 to drive the controller 120, and may include binary data, in which codes for executing the above-described overall operations and logical operations are defined.

Firmware may be stored in a storage space (e.g., working memory, ROM, flash memory) located inside or outside the controller 120. The processor may load all or part of the firmware stored in the storage space.

The working memory may store data (e.g., a plurality of operation requests or firmware) necessary for the controller 120 to process the plurality of operation requests. The working memory may include volatile memory (e.g., an SRAM).

Hereinafter, an operation of the controller 120 will be described in detail.

Figure 2:
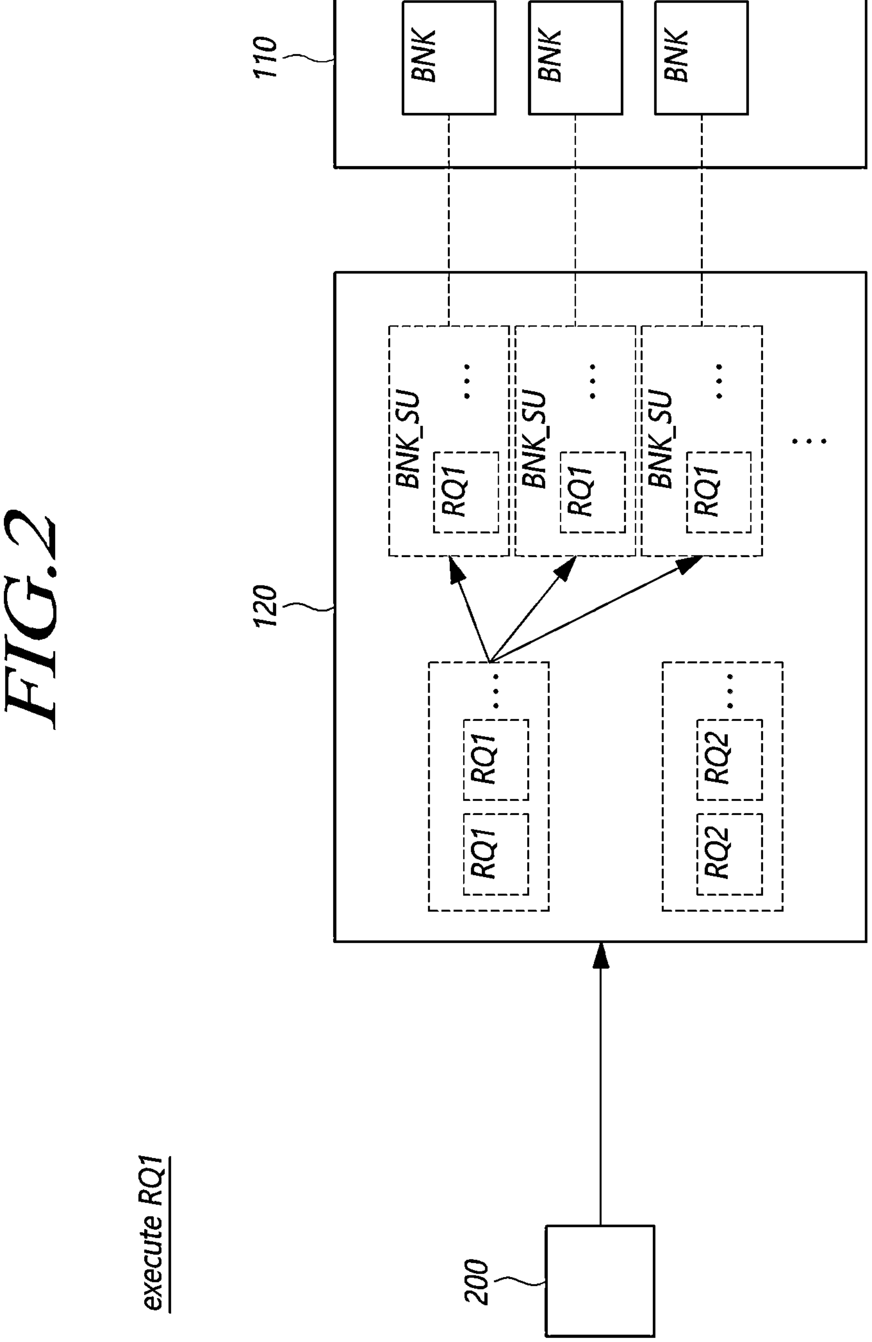
FIG. 2 is a diagram showing an operation in which a controller processes a plurality of operation requests according to an embodiment of the present disclosure.

FIG. 2 is a diagram showing an operation in which a controller processes a plurality of operation requests according to an embodiment of the present disclosure.

Referring to FIG. 2, a controller 120 may store a plurality of first operation requests RQ1 and a plurality of second operation requests RQ2. The controller 120 may generate the plurality of first operation requests RQ1 and the plurality of second operation requests RQ2 based on request from the external device 200. The plurality of first operation requests RQ1 and the plurality of second operation requests RQ2 may be stored within the controller 120 before being processed.

For example, each of the plurality of first operation requests RQ1 may be a read request, and each of the plurality of second operation requests RQ2 may be a write request. Alternatively, each of the plurality of first operation requests RQ1 may be a write request, and each of the plurality of second operation requests RQ2 may be a read request.

In FIG. 2, the controller 120 may process the plurality of first operation requests RQ1 for a dynamic random access memory media 110.

The controller 120 may consecutively process the plurality of first operation requests RQ1. When the controller 120 consecutively processes the plurality of first operation requests RQ1, the controller 120 may not process the plurality of second operation requests RQ2, which wait to be processed within the controller 120. The operation of consecutively processing the plurality of first operation requests RQ1 may be referred to as drain.

When the controller 120 processes the plurality of first operation requests RQ1, the controller 120 may store the plurality of first operations requests in a plurality of storage units BNK_SU that correspond to the plurality of banks BNK, respectively.

A storage unit is a unit that stores operation requests for a corresponding bank. The storage unit may include a plurality of modules capable of storing data (e.g., registers, memory cells) in order to store operation requests. The storage unit may be managed in various types of data structures such as queue, list, and map, etc.

In order to process a first operation request stored in a specific storage unit, the controller 120 may read the first operation request from the specific storage unit and then transmit it to the dynamic random access memory media 110. The dynamic random access memory media 110 may access the bank corresponding to the specific storage unit to execute the received first operation request.

Figure 3:
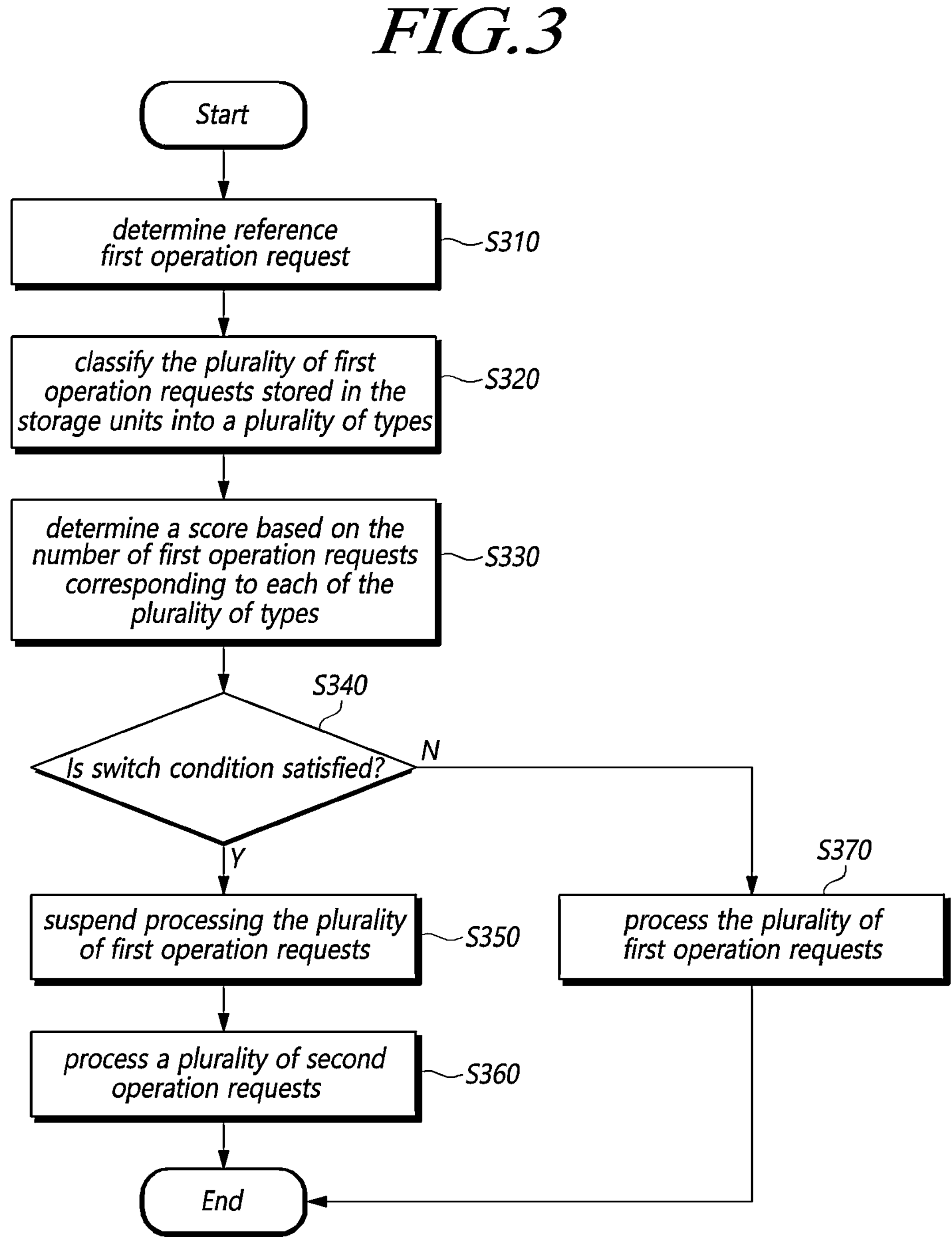
FIG. 3 is a diagram showing an example of an operation of a controller according to an embodiment of the present disclosure.

FIG. 3 is a diagram showing an example of an operation of a controller according to an embodiment of the present disclosure.

Referring to FIG. 3, a controller 120 may determine or select a reference first operation request (S310). The reference first operation request may be a first operation request stored in the controller 120, or a first operation request that the controller 120 has already transmitted to a dynamic random access memory media 110.

The controller 120 may classify a plurality of first operation requests RQ1 stored in the above-describe storage units BNK_SU into a plurality of types based on the reference first operation request (S320). The type of the first operation requests RQ1 stored in the storage units BANK_SU may be classified into one or more of the plurality of types.

The controller 120 may determine a score based on the number of first operation requests corresponding to each of the plurality of types (S330).

The controller 120 may determine whether a switch condition is satisfied (S340).

When the switch condition is satisfied (S340-Y), the controller 120 may suspend the processing of the plurality of first operation requests RQ1 (S350), and switch to the processing a plurality of second operation requests RQ2 for the dynamic random access memory media 110 (S360). That is, the controller 120 may switch the type of operation request currently being processed from a first operation request to a second operation request.

Thus, the controller 120 can efficiently schedule read operations and write operations by switching the operation request currently being processed based on a score, thereby improving read and write performance.

On the other hand, when the switch condition is not satisfied (S340-N), the controller 120 may continue to process the first operation requests RQ1 (S370). That is, the controller 120 may not switch the type of operation request currently being processed.

FIG. 4 is a diagram showing an operation in which a controller determines a score according to an embodiment of the present disclosure.

Referring to FIG. 4, a controller 120 may classify a plurality of first operation requests RQ1 stored in storage units BNK_SU into a K number of types (TYPE_1, TYPE_2, ~, TYPE_K, where K is a natural number of 2 or more).

The controller 120 may count the number of first operation requests RQ1, the number of each count expressed as N1, N2, ~, NK in FIG. 4, that corresponds to each of the plurality of K types TYPE1, TYPE_2, ~, TYPE_K.

The controller 120 may determine a score S using the number of first operation requests N1, N2, ~, NK that correspond respectively to each of the plurality of types TYPE_1, TYPE_2, ~, TYPE_K, and using a plurality of weights W1, W2, ~, WK that correspond respectively to each of the plurality of types TYPE_1, TYPE_2, ~, TYPE_K.

For example, the controller 120 may determine the score S as a sum of the products of each of the plurality of first operation requests N1, N2, ~, NK and the plurality of weights W1, W2, ~, WK, where each of the multiplied first operation requests and the weights correspond the plurality of K types TYPE_1, TYPE_2, ~, TYPE_K respectively:

$$S = (N1 * W1) + (N2 * W2) + \ldots + (NK * WK).$$

In embodiments of present disclosure, the controller 120 may execute an operation to determine the score S in various ways.

For example, the controller 120 may include a separate calculation circuit (not illustrated) to calculate the score S. The calculation circuit may include an adding circuit to add product of the first operation requests N1, N2, ~, NK for each of the K types TYPE_1, TYPE_2, ~, TYPE_K and the weights W1, W2, ~, WK for each of the K types TYPE_1, TYPE_2, ~, TYPE_K, respectively.

The K types TYPE_1, TYPE_2, ~, TYPE_K and their corresponding weights W1, W2, ~, WK may be determined in various ways.

The K types TYPE_1, TYPE_2, ~, TYPE_K may be determined according to the structure of the dynamic random access memory media 110. For example, the K types TYPE_1, TYPE_2, ~, TYPE_K may be predetermined or may be set by the external device 200 when the dynamic random access memory system 100 is booted. The dynamic random access memory system 100 may store information about the K types TYPE_1, TYPE_2, ~, TYPE_K set by the external device 200 in a separate storage space (e.g., a register).

Weights W1, W2, ~, WK corresponding to each of the K types TYPE_1, TYPE_2, ~, TYPE_K may be predetermined or may be set by the external device 200 when the dynamic random access memory system 100 is booted. The dynamic random access memory system 100 may store information about the weights W1, W2, ~, WK set by the external device 200 in a separate storage space (e.g., a register).

Figure 5:
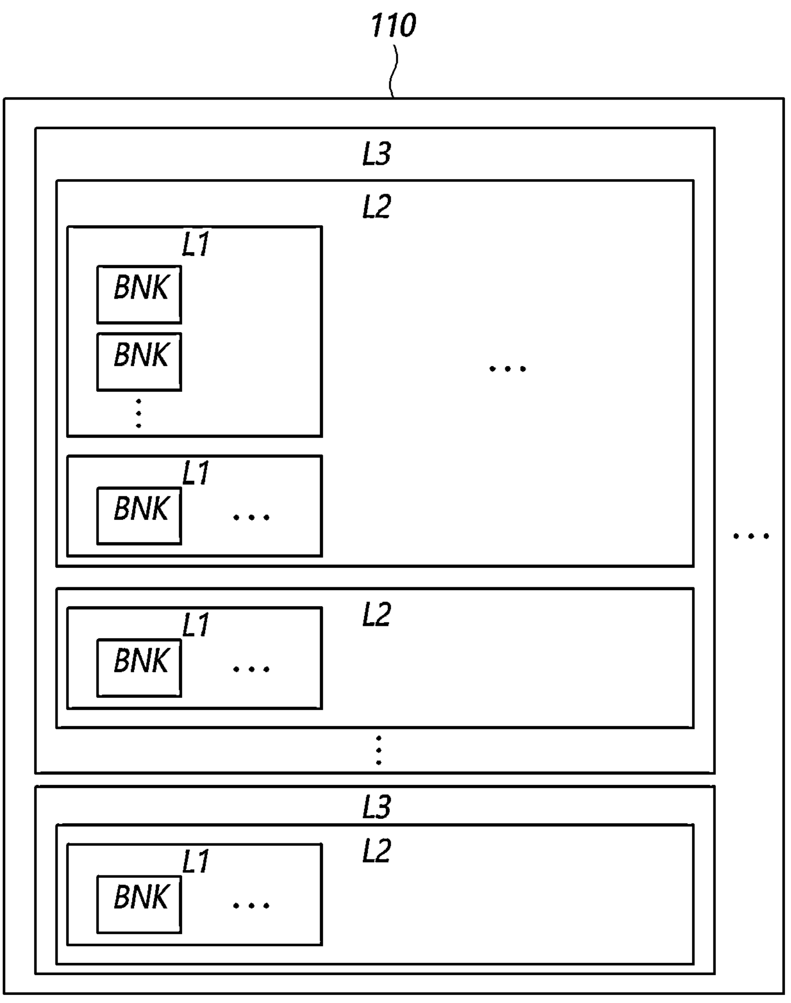
FIG. 5 is a diagram showing an example of structure of a dynamic random access memory media according to an embodiment of the present disclosure.

FIG. 5 is a diagram showing an example of structure of a dynamic random access memory media according to an embodiment of the present disclosure.

Referring to FIG. 5, a dynamic random access memory media 110 may include at least one of first layers L1, second layers L2 and third layers L3.

Each of the first layers L1 may include one or more of a plurality of banks BNK.

Each of the second layers L2 may include one or more of the first layers L1.

Each of the third layers L3 may include one or more of the second layers L2.

Figure 6:
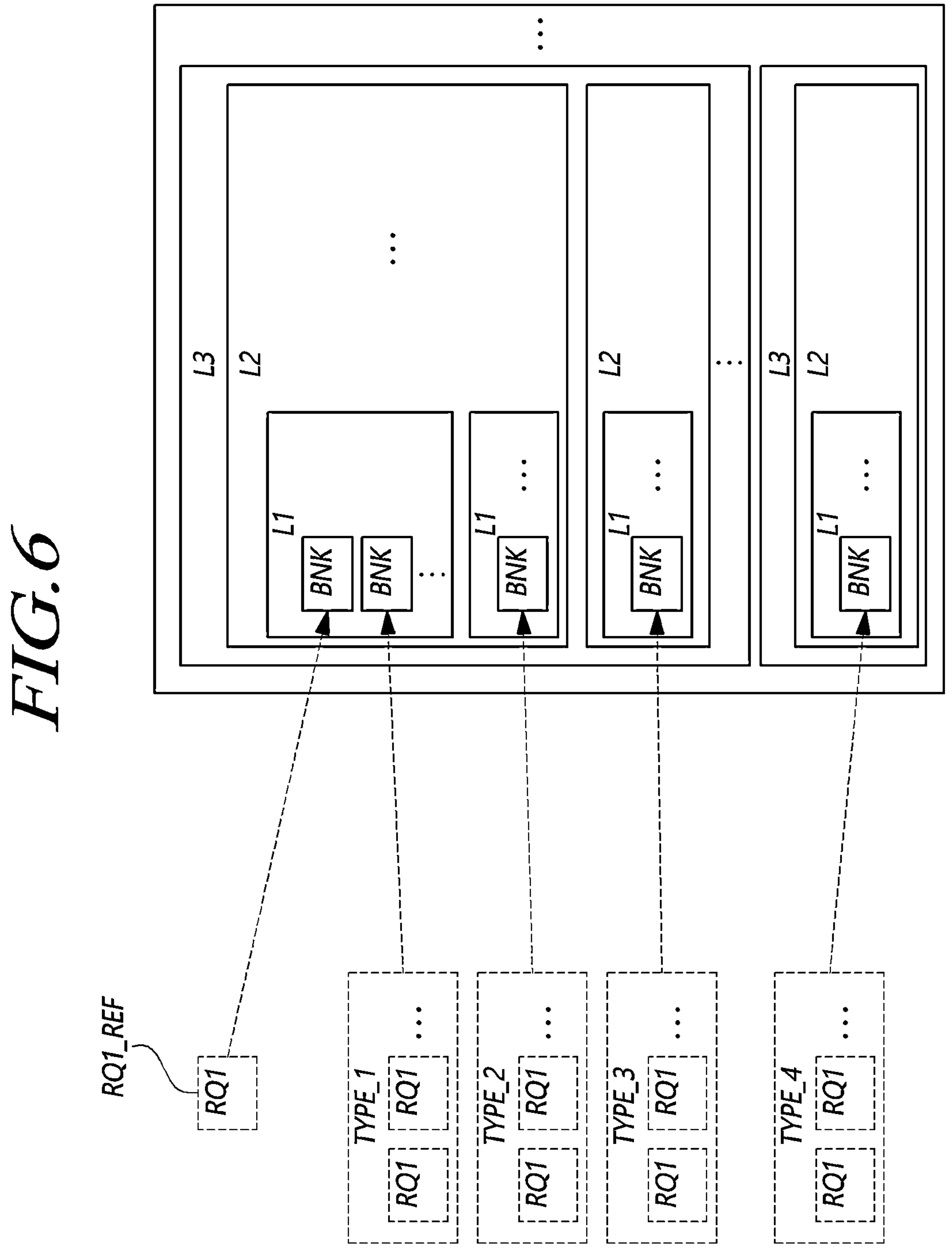
FIG. 6 is a diagram showing an example of a plurality of types according to an embodiment of the present disclosure.

FIG. 6 is a diagram showing an example of a plurality of types according to an embodiment of the present disclosure.

Referring to FIG. 6, a reference first operation request RQ1_REF may correspond to one of a plurality of banks BNK included in a dynamic random access memory media 110. Accordingly, the reference first operation request RQ1_REF may also correspond to the first layer, second layer, and third layer, each of which includes the one of the plurality of banks BNK.

The reference first operation request may be determined in various ways.

For example, the reference first operation request may be the first operation request last executed by the dynamic random access memory media 110. The reference first operation request may be newly determined each time the dynamic random access memory media 110 executes a new first operation request.

A controller 120 may classify a plurality of first operation requests RQ1 into a plurality of types based on the reference first operation request RQ1_REF.

In FIG. 6, at least one of first type, second type, third type, and fourth type may be included in the plurality of types.

A first layer L1 corresponding to a first operation request of a first type TYPE_1, and a first layer L1 corresponding to the reference first operation request RQ1_REF, are the same.

In FIG. 6, a second layer L2 corresponding to a first operation request of the second type TYPE_2, and a second layer L2 corresponding to a reference first operation request RQ1_REF, are the same. The first layer L1 corresponding to the first operation request of the second type TYPE_2, however, is different from the first layer L1 corresponding to the reference first operation request RQ1_REF, even if both first layers L1 are in the same second layer L2.

In FIG. 6, a third layer L3 corresponding to a first operation request of the third type TYPE_3 and a third layer L3 corresponding to the reference first operation request RQ1_REF are the same. The second layer L2 corresponding to the first operation request of the third type TYPE_3, however, and the second layer L2 corresponding to the reference first operation request RQ1_REF are different.

A third layer L3 corresponding to a first operation request of the fourth type TYPE_4 and a third layer L3 corresponding to the reference first operation request RQ1_REF are different.

The weights of the first type TYPE_1, second type TYPE_2, third type TYPE_3 and fourth type TYPE_4 may be determined based on time intervals for the time when the first operation request of each type is executable.

For example, the weight of the first type TYPE_1 may be a time interval from the type when the dynamic random access memory media 110 executes the reference first operation request RQ1_REF to the time when the first operation request of the first type TYPE_1 is executable.

For example, the weight of the second type TYPE_2 may be a time interval from the type when the dynamic random access memory media 110 executes the reference first operation request RQ1_REF to the time when the first operation request of the second type TYPE_2 is executable.

For example, the weight of the third type TYPE_3 may be a time interval from the type when the dynamic random access memory media 110 executes the reference first operation request RQ1_REF to the time when the first operation request of the third type TYPE_3 is executable.

For example, the weight of the fourth type TYPE_4 may be a time interval from the type when the dynamic random access memory media 110 executes the reference first operation request RQ1_REF to the time when the first operation request of the fourth type TYPE_4 is executable.

In the above, an embodiment in which a controller 120 determines the score has been described.

Hereinafter, an operation in which a controller 120 determines whether a switch condition is satisfied, based on the determined score, will be described.

In an embodiment of present disclosure, the controller 120 may determine whether a switch condition is satisfied based on result of comparing the score with threshold score.

In an embodiment of present disclosure, the controller 120 may execute a calculation comparing the score with the threshold score in various ways.

For example, the controller 120 may execute calculations to compare the score with the threshold score through the processor.

As another example, the controller 120 may use a comparator included in the above-described calculation circuit (not shown) to execute calculations to compare the score with the threshold score.

Hereinafter, this will be described in detail in FIGS. 7 to 8.

Figure 7:
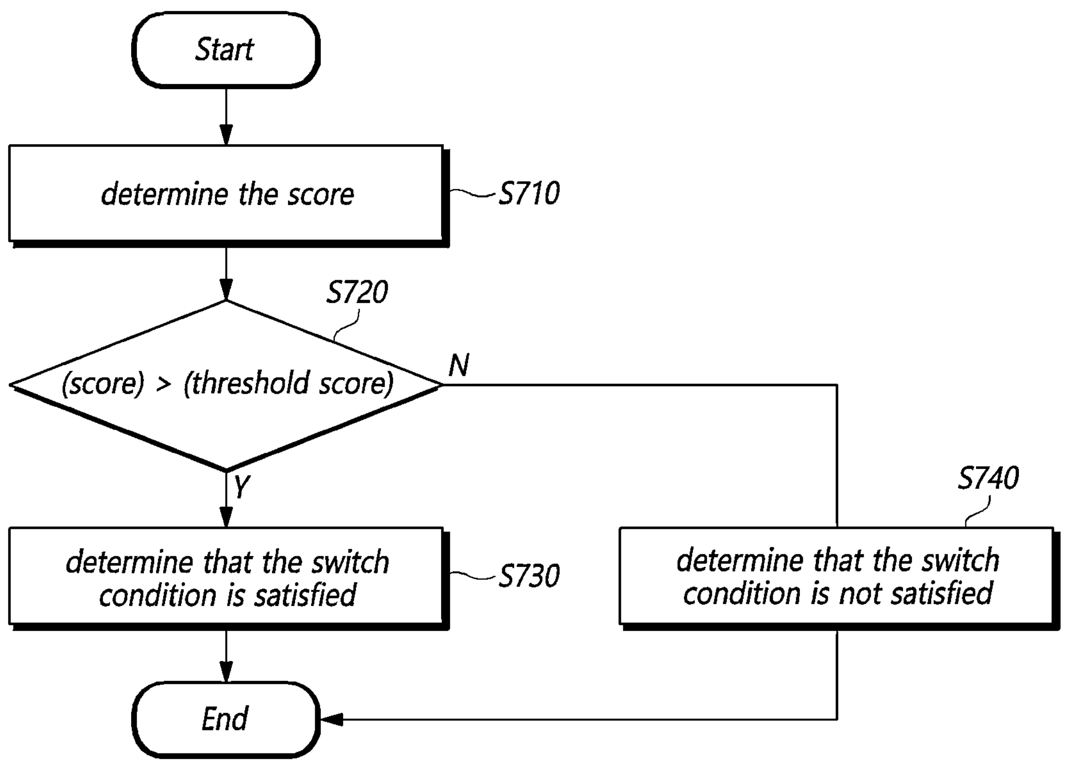
FIG. 7 is a flow chart showing an example in which a controller determines whether a switch condition is satisfied according to an embodiment of the present disclosure.

FIG. 7 is a flow chart showing an example in which a controller determines whether a switch condition is satisfied according to an embodiment of the present disclosure.

Referring to FIG. 7, a controller 120 may determine a score (S710).

Then, the controller 120 determines whether the score is greater than a threshold score S720.

When the score is greater than the threshold score (S720-Y), the controller 120 determines that the switch condition is satisfied (S730). On the other hand, when the score is less than the threshold score (S720-N), the controller 120 determines that the switch condition is not satisfied (S740).

Figure 8:
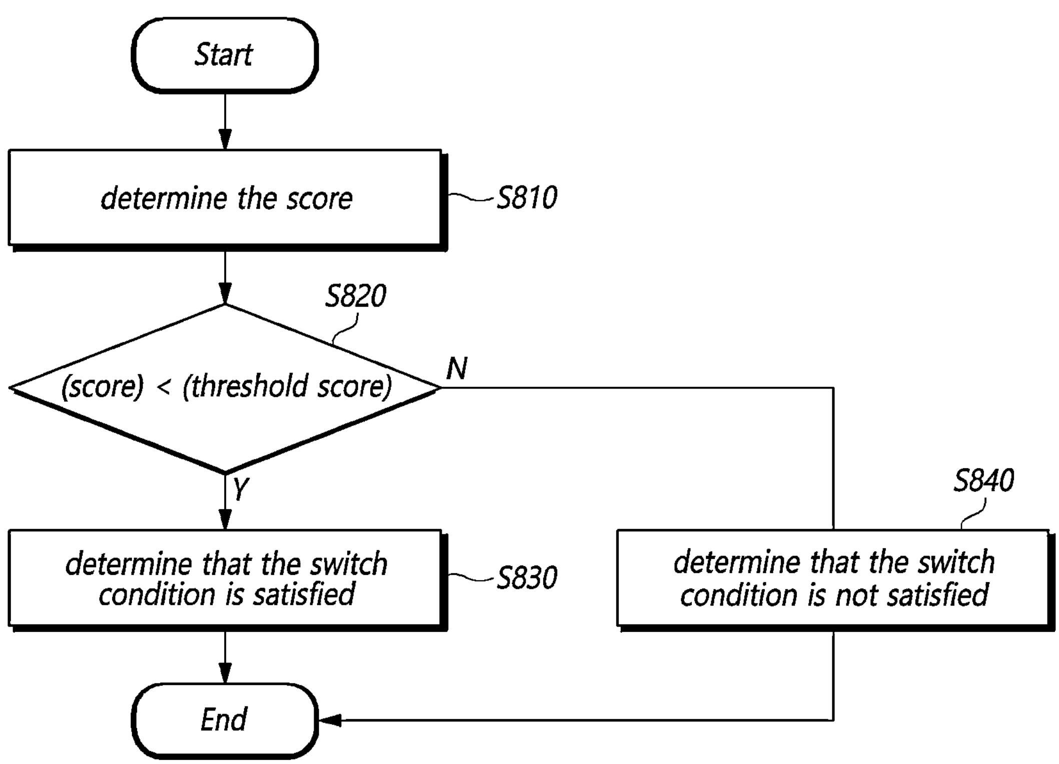
FIG. 8 is a flow chart showing another example in which a controller determines whether a switch condition is satisfied according to an embodiment of the present disclosure.

FIG. 8 is a flow chart showing another example in which a controller determines whether a switch condition is satisfied according to an embodiment of the present disclosure.

Referring to FIG. 8, a controller 120 may determine a score (S810).

Then, the controller 120 determines whether the score is less than a threshold score (S820).

When the score is less than the threshold score (S820-Y), the controller 120 may determine that the switch condition is satisfied (S830). On the other hand, when the score is greater than the threshold score (S820-N), the controller 120 may determine that the switch condition is not satisfied (S840).

In the above, an embodiment in which the controller 120 suspends processing the plurality of first operation requests RQ1 and processes the plurality of second operation requests RQ2 based on the score has been described.

Hereinafter, embodiments in which the controller 120 suspends processing the plurality of first operation requests RQ1 and processes the plurality of second operation requests RQ2 by additionally considering criteria other than the score will be described.

Figure 9:
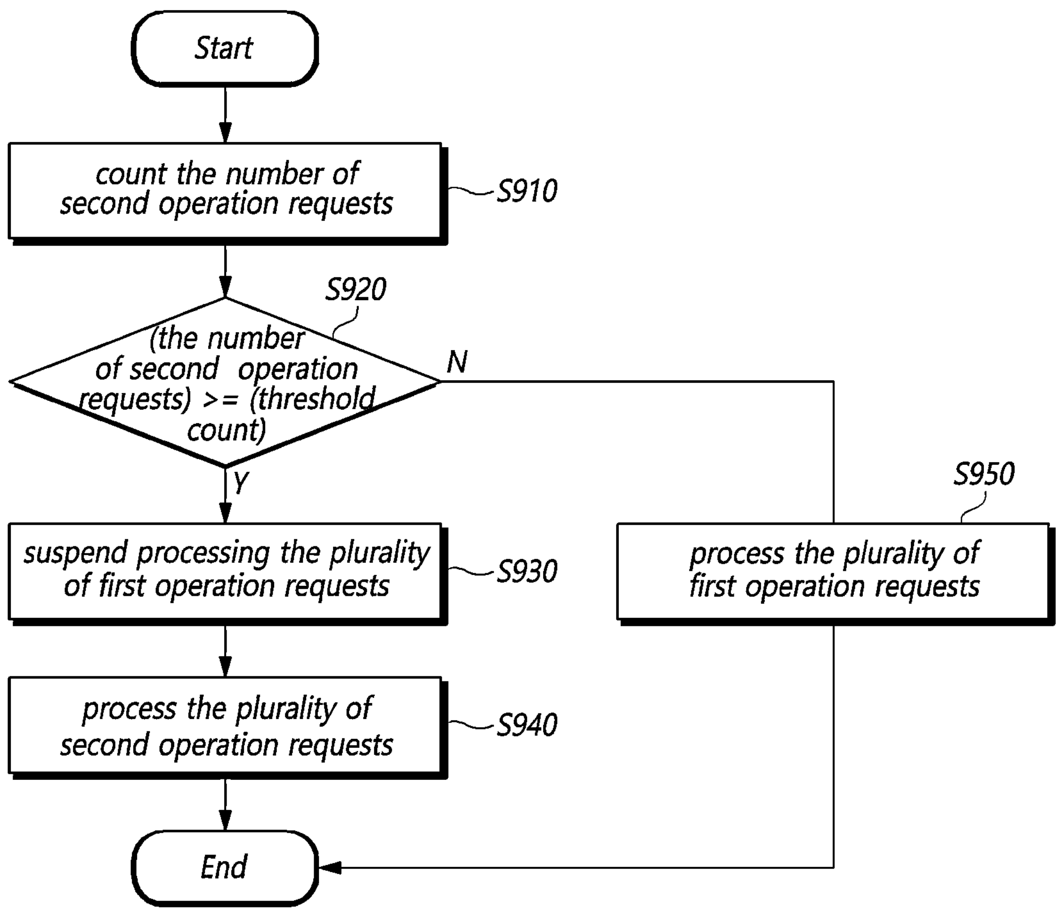
FIG. 9 is a flow chart showing an example of an operation in which a controller determines whether to process a plurality of second operation requests according to an embodiment of the present disclosure.

FIG. 9 is a flow chart showing an example of an operation in which a controller determines whether to process a plurality of second operation requests according to an embodiment of the present disclosure.

Referring to FIG. 9, a controller 120 may count the number of second operation requests RQ2 when the above-described switch condition (S830 of FIG. 6) is satisfied (S910).

The controller 120 determines whether the number of the plurality of second operation requests RQ2 is greater than or equal to a preset threshold count (S920).

When the number of the plurality of second operation requests RQ2 is greater than or equal to the threshold count (S920-Y), the controller 120 may suspend processing the plurality of first operation requests RQ1 (S930), and instead process the plurality of second operation requests RQ2 (S940).

On the other hand, when the number of the plurality of second operation requests RQ2 is less than the threshold count (S920-N), the controller 120 may continue to process the plurality of first operation requests RQ1 (S950). That is, even if the switch condition is satisfied, the controller 120 may not immediately switch the type of the operation request being processed when the number of the plurality of second operation requests RQ2 is less than a threshold count.

Figure 10:
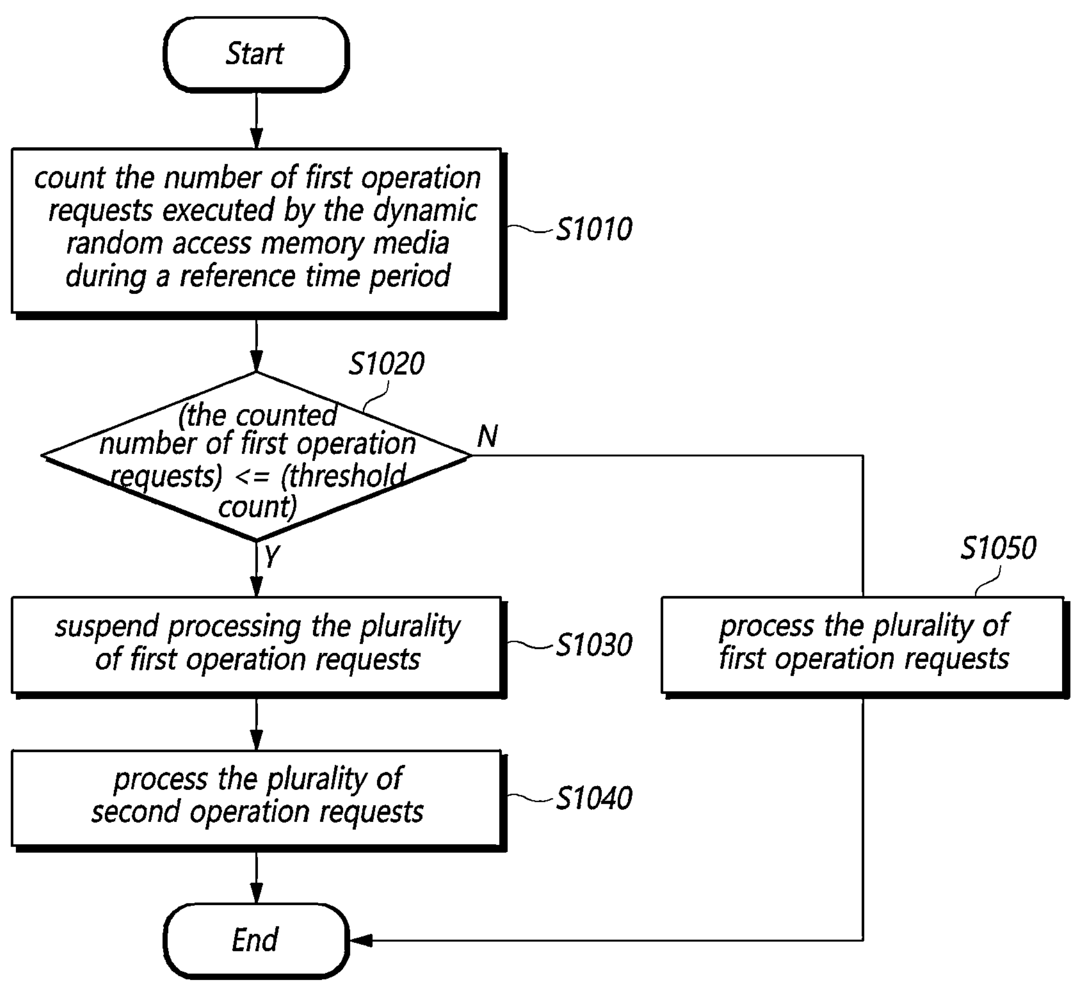
FIG. 10 is a flow chart showing an example of another operation in which a controller determines whether to process a plurality of second operation requests according to an embodiment of the present disclosure.

FIG. 10 is a flow chart showing an example of another operation in which a controller determines whether to process a plurality of second operation requests RQ2 according to an embodiment of the present disclosure.

Referring to FIG. 10, a controller 120 may count the number of first operation requests executed by a dynamic random access memory media 110 during a set reference time period (S1010).

Then, the controller 120 determines whether the counted total number of first operation requests is less than or equal to a threshold count (S1020).

When the counted number of first operation requests is less than or equal to the threshold count (S1020-Y), the controller 120 may suspend processing of the plurality of first operation requests RQ1 (S1030), and switch to processing of the plurality of second operation requests RQ2 (S1040).

On the other hand, when the total number of first operation requests is greater than the threshold count (S1020-N), the controller 120 may continue to process the plurality of first operation requests RQ1 (S1050).

Figure 11:
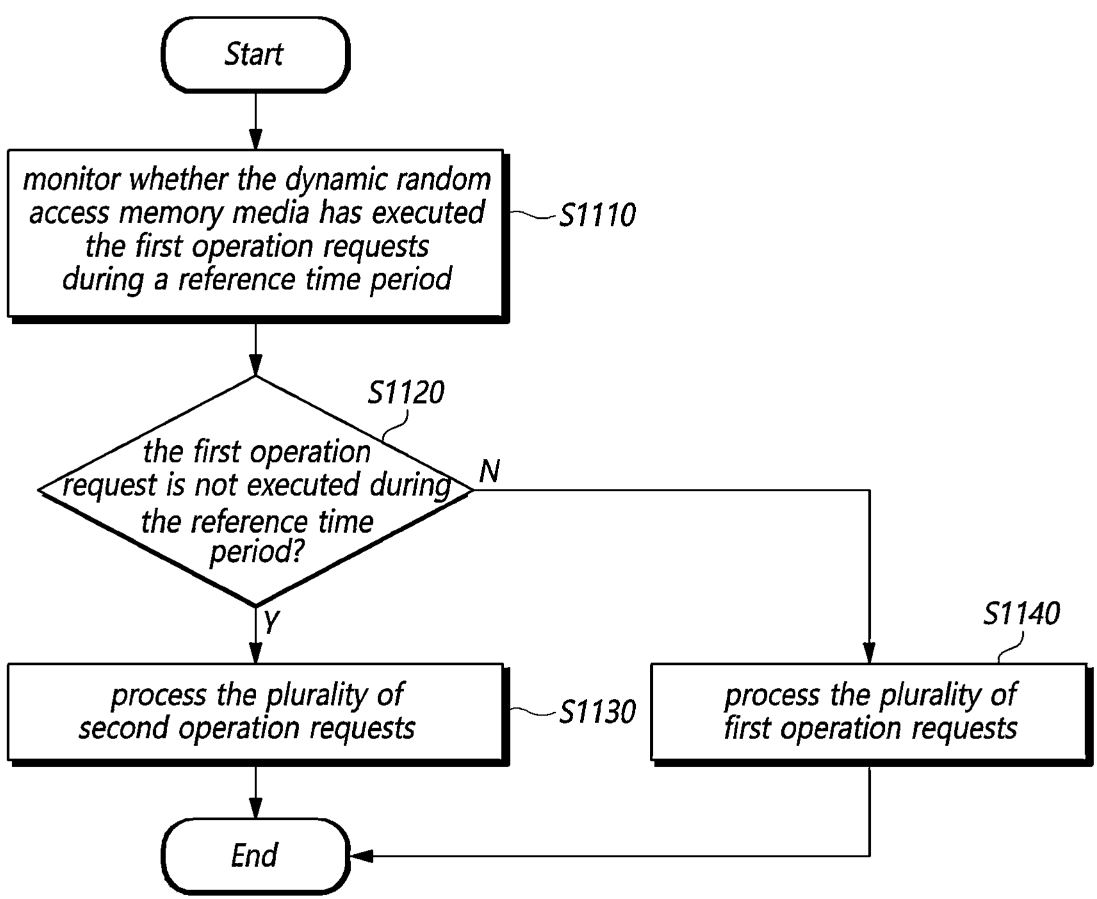
FIG. 11 is a flow chart showing an example of another operation in which a controller determines whether to process a plurality of second operation requests according to an embodiment of the present disclosure.

FIG. 11 is a flow chart showing an example of another operation in which a controller determines whether to process a plurality of second operation requests according to an embodiment of the present disclosure.

Referring to FIG. 11, a controller 120 may monitor whether a dynamic random access memory media 110 has executed first operation requests during a set reference time period (S1110).

The controller 120 may determine whether the dynamic random access memory media 110 has executed a first operation request during the reference time period (S1120).

When the dynamic random access memory media 110 does not execute a first operation request during the reference time period (S1120-Y), the controller 120 may process the plurality of second operation requests RQ2 (S1130).

On the other hand, when the dynamic random access memory media 110 executes a first operation request during the reference time period (S1120-N), the controller 120 may process all of the plurality of first operation requests RQ1 (S1140).

Figure 12:
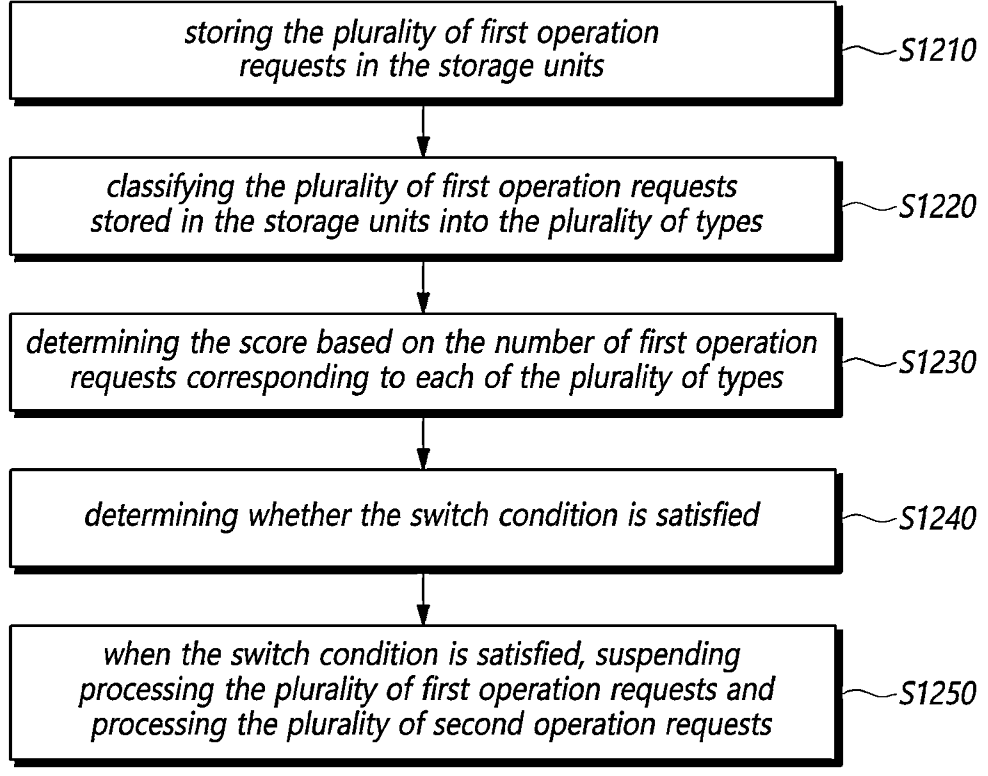
FIG. 12 is a flow chart showing an operating method of a dynamic random access memory system according to an embodiment of the present disclosure.

FIG. 12 is a flow chart showing an operating method of a dynamic random access memory system according to an embodiment of the present disclosure.

Referring to FIG. 12, an operating method of a dynamic random access memory system 100 may include, when processing a plurality of first operation requests RQ1 for a dynamic random access memory media 110 including the plurality of banks BNK, storing the plurality of first operation requests RQ1 in a plurality of storage units BNK_SU corresponding to each of the plurality of banks BNK respectively (S1210).

The operating method of the dynamic random access memory system 100 may include classifying the plurality of first operation requests RQ1 stored in the storage units BNK_SU into a plurality of types based on a reference first operation request RQ1_REF (S1220).

In an example, the reference first operation request RQ1_REF may be the first operation request last executed by the dynamic random access memory media 110.

The dynamic random access memory media 110 may include at least one of a plurality of first layers L1, each including one or more of the plurality of banks, a plurality of second layers L2 each including one or more of the plurality of first layers L1, and a plurality of third layers L3 each including one or more of the plurality of second layers L2.

At least one of first type TYPE_1, second type TYPE_2, third type TYPE_3, and fourth type TYPE_4 may be included in the plurality of types. A first layer corresponding to a first operation request of the first type TYPE_1 and a first layer corresponding to a reference first operation request RQ1_REF may be the same. A second layer corresponding to a first operation request of the second type TYPE_1 and a second layer corresponding to the reference first operation request RQ1_REF may be the same. A first layer corresponding to a first operation request of the second type TYPE_2 and a first layer corresponding to a reference first operation request RQ1_REF may be different. A third layer corresponding to a first operation request of the third type TYPE_3 and a third layer corresponding to the reference first operation request RQ1_REF may be the same. A second layer corresponding to a first operation request of the third type TYPE_3 and a second layer corresponding to a reference first operation request RQ1_REF may be different. A third layer corresponding to a first operation request of the fourth type TYPE_1 and a third layer corresponding to a reference first operation request RQ1_REF may be different.

The operating method of a dynamic random access memory system 100 may include determining a score based on the number of first operation requests corresponding to each of the plurality of types (S1230).

For example, the operation S1230 may determine the score based on the number of first operation requests and weights corresponding to each of the plurality of types.

The operating method of the dynamic random access memory system 100 may include determining whether a switch condition (i.e., conditions for switching operations) is satisfied based on the score (S1240).

For example, the operation S1240 may determine whether a switch condition is satisfied based on result of comparing the score with a threshold score.

The operating method of the dynamic random access memory system 100 may include, when the switch condition is satisfied, suspending processing of the plurality of first operation requests RQ1 and changing to processing of the plurality of second operation requests RQ2 (S1250).

The operating method of the dynamic random access memory system 100 may further include determining whether the number of the plurality of second operation requests RQ2 is greater than or equal to a threshold count while the switch condition is satisfied, and suspending processing of the plurality of first operation requests RQ1 and switching to processing of the plurality of second operation requests RQ2 when the number of the plurality of second operation requests RQ2 is greater than or equal to the threshold count.

The operating method of the dynamic random access memory system 100 may further include determining whether the number of the plurality of second operation requests RQ2 is less than or equal to the threshold count during a reference time period, and when the number of the plurality of first operation requests RQ1 is less than or equal to the threshold count, suspending processing of the plurality of first operation requests RQ1 and switching to processing of the plurality of second operation requests RQ2.

Meanwhile, the operating method of the dynamic random access memory system 100 may further include determining whether the dynamic random access memory media 110 has executed any of the plurality of the first operation requests during a reference time period, and when the dynamic random access memory media 110 does not execute any of the plurality of the first operation requests during the reference time period, switching to processing of the plurality of second operation requests RQ2.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A dynamic random access memory system comprising:

a dynamic random access memory media including a plurality of banks; and a controller configured to:

store, when processing a plurality of first operation requests for the dynamic random access memory media, the plurality of first operation requests in a plurality of storage units corresponding to each of the plurality of banks respectively, classify the plurality of first operation requests into a plurality of types based on a reference first operation request, determine a score based on the number of first operation requests corresponding to each of the plurality of types, determine whether a switch condition is satisfied based on the score, and suspend, when the switch condition is satisfied, processing of the plurality of first operation requests and switching to processing of a plurality of second operation requests, wherein the controller is configured to determine the score based on weights corresponding to each of the plurality of types in addition to the number of first operation requests, a weight of each of the plurality of types being determined based on the amount of time before the first operation request of each type is executable.

2. The dynamic random access memory system according to claim 1, wherein each of the plurality of first operation requests is a read request and each of the plurality of second operation requests is a write request, or wherein each of the plurality of first operation requests is a write request and each of the plurality of second operation requests is a read request.

3. The dynamic random access memory system according to claim 1, wherein the reference first operation request is the first operation request last executed by the dynamic random access memory media.

4. The dynamic random access memory system according to claim 1, wherein the dynamic random access memory media includes at least one of a plurality of first layers each including one or more of the plurality of banks, a plurality of second layers each including one or more of the plurality of first layers, and a plurality of third layers each including one or more of the plurality of second layers.

5. The dynamic random access memory system according to claim 4, wherein at least one of a first type, a second type, a third type, and a fourth type are included in the plurality of types, wherein a first layer corresponding to a first operation request of the first type and a first layer corresponding to the reference first operation request are the same, wherein a second layer corresponding to a first operation request of the second type and a second layer corresponding to the reference first operation request are the same, and a first layer corresponding to the first operation request of the second type and the first layer corresponding to the reference first operation request are different, wherein a third layer corresponding to a first operation request of the third type and a third layer corresponding to the reference first operation request are the same, and a second layer corresponding to the first operation request of the third type and the second layer corresponding to the reference first operation request are different, and wherein a third layer corresponding to a first operation request of the fourth type and the third layer corresponding to the reference first operation request are different.

6. The dynamic random access memory system according to claim 5, wherein weights of the first type, second type, third type and fourth type are determined based on an amount of time before the first operation request of each type is executable.

7. The dynamic random access memory system according to claim 6, wherein the weight of the first type is a time interval from when the dynamic random access memory media executes the reference first operation request to a time when the first operation request of the first type is executable, wherein the weight of the second type is a time interval from when the dynamic random access memory media executes the reference first operation request to a time when the first operation request of the second type is executable, wherein the weight of the third type is a time interval from when the dynamic random access memory media executes the reference first operation request to a time when the first operation request of the third type is executable, and wherein the weight of the fourth type is a time interval from when the dynamic random access memory media executes the reference first operation request to a time when the first operation request of the fourth type is executable.

8. The dynamic random access memory system according to claim 1, wherein the controller is configured to determine whether a switch condition is satisfied based on a result of comparing the score with a threshold score.

9. The dynamic random access memory system according to claim 1, wherein the controller is configured to suspend processing of the plurality of first operation requests and switch to processing of the plurality of second operation requests when the number of the plurality of second operation requests is greater than or equal to a preset threshold count after the switch condition is satisfied.

10. The dynamic random access memory system according to claim 1, wherein the controller is configured to suspend processing of the plurality of first operation requests and switch to processing of the plurality of second operation requests when the number of the plurality of first operation requests is less than or equal to a set threshold count during a reference time period.

11. The dynamic random access memory system according to claim 1, wherein the controller is configured to process the plurality of second operation requests when the dynamic random access memory media does not execute any of the plurality of the first operation requests during a set reference time period.

12. An operating method of a dynamic random access memory system comprising:

storing, when processing a plurality of first operation requests for dynamic random access memory media including a plurality of banks, the plurality of first operation requests in storage units corresponding to each of the plurality of banks respectively;

classifying the plurality of first operation requests stored in the storage units into a plurality of types based on a reference first operation request;

determining a score based on the number of first operation requests corresponding to each of the plurality of types;

determining whether a switch condition is satisfied based on the score; and when the switch condition is satisfied, suspending processing of the plurality of first operation requests and changing to processing of a plurality of second operation requests for the dynamic random access memory media, wherein determining the score is further based on weights corresponding to each of the plurality of types in addition to the number of first operation requests, a weight of each of the plurality of types being determined based on the amount of time before the first operation request of each type is executable.

13. The method according to claim 12, wherein the reference first operation request is a first operation request last executed by the dynamic random access memory media.

14. The method according to claim 12, wherein the dynamic random access memory media includes at least one of a plurality of first layers each including one or more of the plurality of banks, a plurality of second layers each including one or more of the plurality of first layers, and a plurality of third layers each including one or more of the plurality of second layers.

15. The method according to claim 14, wherein at least one of first type, second type, third type, and fourth type are included in the plurality of types, wherein a first layer corresponding to a first operation request of the first type and a first layer corresponding to the reference first operation request are the same, wherein a second layer corresponding to a first operation request of the second type and a second layer corresponding to the reference first operation request are the same, and a first layer corresponding to a first operation request of the second type and the first layer corresponding to the reference first operation request are different, wherein a third layer corresponding to a first operation request of a third type and a third layer corresponding to the reference first operation request are the same, and a second layer corresponding to the first operation request of the third type and the second layer corresponding to the reference first operation request are different, and wherein a third layer corresponding to a first operation request of the fourth type and the third layer corresponding to the reference first operation request are different.

16. The method according to claim 15, wherein weights of the first type, second type, third type and fourth type are based on a time interval before the first operation request of each type is executable.

17. The method according to claim 16, wherein the weight of the first type is a time interval from when the dynamic random access memory media executes the reference first operation request to a time when the first operation request of the first type is executable, wherein the weight of the second type is a time interval from when the dynamic random access memory media executes the reference first operation request to a time when the first operation request of the second type is executable, wherein the weight of the third type is a time interval from when the dynamic random access memory media executes the reference first operation request to a time when the first operation request of the third type is executable, and wherein the weight of the fourth type is a time interval from when the dynamic random access memory media executes the reference first operation request to a time when the first operation request of the fourth type is executable.

18. The method according to claim 16, wherein determining whether a switch condition is satisfied is based on a result of comparing the score with a threshold score.

* * * * *